(12) United States Patent  
Shimizu

(10) Patent No.: US 11,082,684 B2  
(45) Date of Patent: Aug. 3, 2021

(54) INFORMATION PROCESSING APPARATUS AND RECORDING MEDIUM

(71) Applicant: SOCIONEXT INC., Kanagawa (JP)

(72) Inventor: Seiya Shimizu, Kanagawa (JP)

(73) Assignee: SOCIONEXT INC., Kanagawa (JP)

( * ) Notice: Subject to any disclaimer, the term of this patent is extended or adjusted under 35 U.S.C. 154(b) by 30 days.

(21) Appl. No.: 16/789,221

(22) Filed: Feb. 12, 2020

(65) Prior Publication Data

US 2020/0186788 A1 Jun. 11, 2020

Related U.S. Application Data

(63) Continuation of application No. PCT/JP2017/030459, filed on Aug. 25, 2017.

(51) Int. Cl.
*H04N 13/327* (2018.01)
*B60R 1/00* (2006.01)
*G06T 3/00* (2006.01)
*H04N 9/31* (2006.01)

(52) U.S. Cl.
CPC ......... *H04N 13/327* (2018.05); *H04N 9/3188* (2013.01)

(58) Field of Classification Search
CPC ............... B60R 1/00; B60R 2300/605; B60R 2300/607; G06T 1/00; G06T 3/00; G06T 3/0093; H04N 13/327; H04N 7/18; H04N 9/3188; H04N 5/23238
USPC ......................................................... 348/43
See application file for complete search history.

(56) References Cited

U.S. PATENT DOCUMENTS

| | | | |
|---|---|---|---|
| 7,307,655 B1 * | 12/2007 | Okamoto | G06K 9/00791 348/222.1 |
| 10,757,395 B2 * | 8/2020 | Nobori | B60R 1/00 |
| 2001/0012985 A1 * | 8/2001 | Okamoto | G06T 7/80 702/94 |

(Continued)

FOREIGN PATENT DOCUMENTS

| | | |
|---|---|---|
| JP | 2008-187566 A | 8/2008 |
| JP | 2009-232310 A | 10/2009 |

(Continued)

OTHER PUBLICATIONS

International Search Report issued in corresponding International Patent Application No. PCT/JP2017/030459, dated Nov. 14, 2017, with English translation.

*Primary Examiner* — Behrooz M Senfi
*Assistant Examiner* — Kathleen M Walsh
(74) *Attorney, Agent, or Firm* — McDermott Will & Emery LLP

(57) ABSTRACT

An information processing apparatus includes a memory and a processor coupled to the memory that obtains projection information used for generating a three-dimensional overhead image by projecting a plurality of image data imaged by a plurality of imaging devices to a three-dimensional projection surface when the plurality of imaging devices are installed in a first mobile object, that inputs size information of a second mobile object that is different from the first mobile object, that corrects the projection information based on a size ratio between the first mobile object and the second mobile object, calculated based on the size information of the second mobile object, and that stores corrected projection information in the second mobile object.

11 Claims, 18 Drawing Sheets

(56) References Cited

U.S. PATENT DOCUMENTS

| | | |
|---|---|---|
| 2008/0231710 A1 | 9/2008 | Asari et al. |
| 2010/0231717 A1 | 9/2010 | Sasaki et al. |
| 2010/0245573 A1* | 9/2010 | Gomi .................... H04N 7/181 348/148 |
| 2011/0032357 A1* | 2/2011 | Kitaura .................. G06T 5/006 348/148 |
| 2012/0002050 A1 | 1/2012 | Taniguchi et al. |
| 2012/0069153 A1* | 3/2012 | Mochizuki ............. H04N 7/181 348/47 |
| 2012/0287232 A1* | 11/2012 | Natroshvili ............... G06T 7/33 348/36 |
| 2012/0293659 A1* | 11/2012 | Bandou .............. H04N 5/23238 348/148 |
| 2013/0135474 A1* | 5/2013 | Sakano ............. G06K 9/00791 348/148 |
| 2013/0194256 A1* | 8/2013 | Gassmann ............. G08G 1/163 345/419 |
| 2014/0176679 A1* | 6/2014 | Lehning ............. G06K 9/00785 348/46 |
| 2014/0340427 A1* | 11/2014 | Baker .................. H04N 13/207 345/641 |
| 2015/0178884 A1* | 6/2015 | Scholl .................... G06T 3/0018 348/36 |
| 2016/0080699 A1* | 3/2016 | Scholl ...................... B60R 1/00 348/148 |
| 2016/0176343 A1* | 6/2016 | Sakano .................... G06K 9/52 348/148 |
| 2016/0275683 A1 | 9/2016 | Sakano et al. |
| 2016/0371843 A1* | 12/2016 | Scholl .................... G06T 7/536 |
| 2017/0195564 A1* | 7/2017 | Appia ................ H04N 5/23238 |
| 2018/0232909 A1* | 8/2018 | Gagnon ............... G06K 9/3258 |
| 2020/0238907 A1* | 7/2020 | Watanabe ............. H04N 7/188 |

FOREIGN PATENT DOCUMENTS

| | | |
|---|---|---|
| JP | 2010-246088 A | 10/2010 |
| JP | 2012-011849 A | 1/2012 |
| JP | 2013-089984 A | 5/2013 |
| JP | 2015-106785 A | 6/2015 |
| JP | 2016-072786 A | 5/2016 |
| JP | 2017-216489 A | 12/2017 |
| WO | 2015/029934 A1 | 3/2015 |

\* cited by examiner

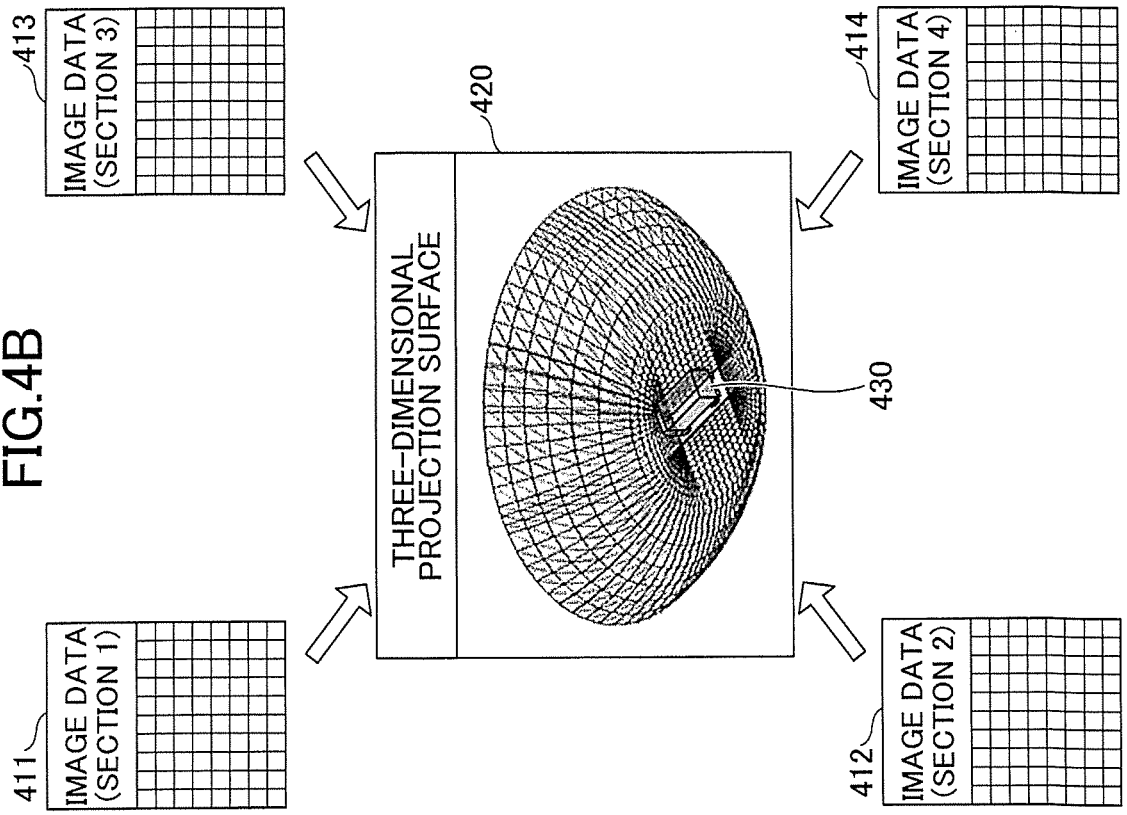

FIG.14

| PROJECTION INFORMATION AFTER CORRECTION ||| 
|---|---|---|
| IMAGING DEVICE || THREE-DIMENSIONAL PROJECTION SURFACE COORDINATES |
| SECTION | IMAGE PIXEL COORDINATES | |
| 1 | $(s_{11}, t_{11})$<br>$(s_{11}, t_{12})$<br>$\vdots$<br>$(s_{1n}, t_{1m})$ | $(X_{11}, Y_{11}, Z_{11})$<br>$(X_{12}, Y_{12}, Z_{12})$<br>$\vdots$<br>$(X_{1p}, Y_{1q}, Z_{1r})$ |
| 2 | $(s_{21}, t_{21})$<br>$(s_{21}, t_{22})$<br>$\vdots$<br>$(s_{2n}, t_{2m})$ | $(X_{21}, Y_{21}, Z_{21})$<br>$(X_{22}, Y_{22}, Z_{22})$<br>$\vdots$<br>$(X_{2p}, Y_{2q}, Z_{2r})$ |
| 3 | $(s_{31}, t_{31})$<br>$(s_{31}, t_{32})$<br>$\vdots$<br>$(s_{3n}, t_{3m})$ | $(X_{31}, Y_{31}, Z_{31})$<br>$(X_{32}, Y_{32}, Z_{32})$<br>$\vdots$<br>$(X_{3p}, Y_{3q}, Z_{3r})$ |
| 4 | $(s_{41}, t_{41})$<br>$(s_{41}, t_{42})$<br>$\vdots$<br>$(s_{4n}, t_{4m})$ | $(X_{41}, Y_{41}, Z_{41})$<br>$(X_{42}, Y_{42}, Z_{42})$<br>$\vdots$<br>$(X_{4p}, Y_{4q}, Z_{4r})$ |

1400

420 1310

1800 1310

INFORMATION PROCESSING APPARATUS AND RECORDING MEDIUM

CROSS-REFERENCE TO RELATED APPLICATIONS

The present application is a continuation application of International Application PCT/JP2017/030459 filed on Aug. 25, 2017 and designated the U.S., the entire contents of which are incorporated herein by reference.

FIELD

The disclosures herein relate to an information processing apparatus and a recording medium.

BACKGROUND

A three-dimensional overhead image generation system that generates a three-dimensional overhead image of an area all around a vehicle viewed from above by imaging an area around a vehicle with multiple imaging devices, and by projecting multiple images, which are taken by the multiple imaging devices, to a three-dimensional projection surface by using projection information, has been known.

A three-dimensional overhead image generated by the three-dimensional overhead image generation system generally depends on a location of an imaging device for example, and is different between vehicle types. Thus, a vehicle manufacturer performs a calibration operation to calibrate a three-dimensional projection surface, projection information, etc. for each vehicle type in vehicle manufacturing in order to achieve an appropriate three-dimensional overhead image.

RELATED-ART DOCUMENTS

Patent Document

[Patent Document 1] Japanese Laid-Open Patent Publication No. 2009-232310
[Patent Document 2] Japanese Laid-Open Patent Publication No. 2016-072786
[Patent Document 3] Japanese Patent No. 6068710
[Patent Document 4] International Publication Pamphlet No. WO 2015/029934
[Patent Document 5] Japanese Laid-Open Patent Publication No. 2008-187566

SUMMARY

According to an aspect of the embodiment, an information processing apparatus includes a memory and a processor coupled to the memory that obtains projection information used for generating a three-dimensional overhead image by projecting a plurality of image data imaged by a plurality of imaging devices to a three-dimensional projection surface when the plurality of imaging devices are installed in a first mobile object, that inputs size information of a second mobile object that is different from the first mobile object, that corrects the projection information based on a size ratio between the first mobile object and the second mobile object, calculated based on the size information of the second mobile object, and that stores corrected projection information in the second mobile object.

BRIEF DESCRIPTION OF THE DRAWINGS

FIGS. 4A and 4B are drawings illustrating an example of projection information;

FIG. 14 is a drawing illustrating a specific example of projection information after correction;

DESCRIPTION OF EMBODIMENTS

Figure 1:
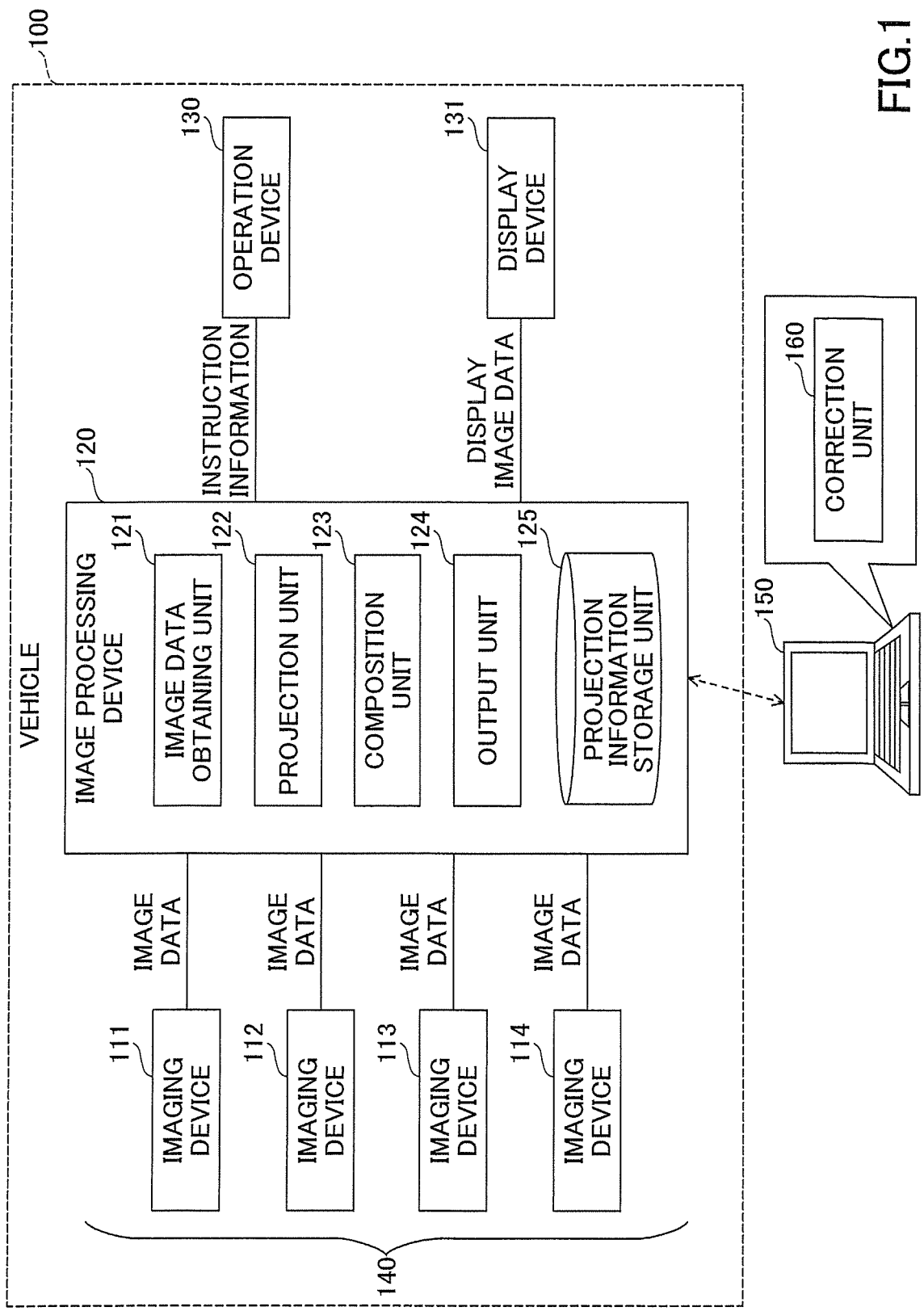
FIG. 1 is a drawing illustrating an overview of a three-dimensional overhead image generation system and an information processing apparatus.

There is a need for newly installing a three-dimensional overhead image generation system after purchasing a vehicle, or replacing a three-dimensional overhead image generation system installed in a newly purchased vehicle with a three-dimensional overhead image generation system installed in an old vehicle.

However, when a type of a purchased vehicle is different from a target vehicle type of a three-dimensional overhead image generation system, the three-dimensional overhead image generation system cannot be used as it is, and it is necessary to calibrate the three-dimensional overhead image generation system with respect to the purchased vehicle.

In such a case, it is not easy for a purchaser to perform a calibration operation individually, and there is a problem that an operation workload is high.

In the following, embodiments of the present invention will be described with reference to the accompanying drawings. In the present specification and drawings, the constituent elements having a substantially same functional configuration are denoted by the same reference numeral, and duplicated descriptions are omitted.

First Embodiment

<A Description of a Three-Dimensional Overhead Image Generation System and an Information Processing Apparatus>

First, an overview of a three-dimensional overhead image generation system installed in a vehicle and an information processing apparatus connected to the three-dimensional overhead image generation system enabled for communication, will be described. FIG. 1 is a drawing illustrating an overview of a three-dimensional overhead image generation system and an information processing apparatus.

An example of FIG. 1 illustrates a state in which a three-dimensional overhead image generation system 140 is installed in a vehicle 100. In FIG. 1, the three-dimensional overhead image generation system 140 is a three-dimensional overhead image generation system provided for a vehicle (which will be referred to as a reference vehicle) different from the vehicle 100, as a first mobile object. Thus, the example of FIG. 1 illustrates a state in which the three-dimensional overhead image generation system 140 provided for a reference vehicle that is a first mobile object is installed in the vehicle 100 that is a second mobile object.

As illustrated in FIG. 1, the three-dimensional overhead image generation system 140 installed in the vehicle 100 includes an imaging device ill, an imaging device 112, an imaging device 113, an imaging device 114, an image processing device 120, an operation device 130, and a display device 131.

The imaging devices from 111 to 114 generate image data by imaging a front area, a left area, a right area, and a rear area from the vehicle 100, and send generated images to the image processing device 120.

The image processing device 120 is, for example, implemented by an ECU (Electronic Control Unit). In the image processing device 120, an image data obtaining program, a projection program, a composition program, and an output program are installed. The image processing device 120 functions as an image data obtaining unit 121, a projection unit 122, a composition unit 123, and an output unit 124 by executing the programs.

The image data obtaining unit 121 obtains image data sent from the imaging devices from 111 to 114.

The projection unit 122 projects each image data obtained by the image data obtaining unit 121 to a three-dimensional projection surface based on projection information stored in a projection information storage unit 125.

The composition unit 123 generates a three-dimensional overhead image by combining image data projected on the three-dimensional projection surface.

The output unit 124 generates display image data for displaying the three-dimensional overhead image generated by the composition unit 123 as an image viewed from a predetermined viewpoint position, and outputs the display image data to the display device 131.

The operation device 130 is an operation device for a person in the vehicle 100 inputting various instructions to the image processing device 120. The various instructions input to the operation device 130 are sent to the image processing device 120 as instruction information.

The display device 131 is a display device that displays the display image data output from the image processing device 120.

In FIG. 1, an information processing apparatus 150 is an example of an information processing apparatus, and is, for example, owned by a calibrating technician who performs a calibration operation when the three-dimensional overhead image generation system 140 is installed in the vehicle 100. A calibrating technician performs a calibrating operation by connecting the information processing apparatus 150 to the image processing device 120 and by operating the information processing apparatus 150 when the three-dimensional overhead image generation system 140 is installed in the vehicle 100.

In the information processing apparatus 150, a correction program is installed, and the information processing apparatus 150 functions as a correction unit 160 by executing the program.

The correction unit 160 is launched by connecting the information processing apparatus 150 to the image processing device 120, and performs a calibration process to calibrate the three-dimensional overhead image generation system 140 with respect to the vehicle 100 based on an operation of a calibrating technician.

In the following, details of the three-dimensional overhead image generation system 140 and the information processing apparatus 150 will be described in this order. In the following description, it is assumed that the reference vehicle is a truck, and that the vehicle 100 in which the three-dimensional overhead image generation system 140 is installed is a truck that is larger than the reference vehicle.

<Details of the Three-Dimensional Overhead Image Generation System>

First, details of the three-dimensional overhead image generation system 140 will be described.

(1) An Example of Disposition

Figure 2A:
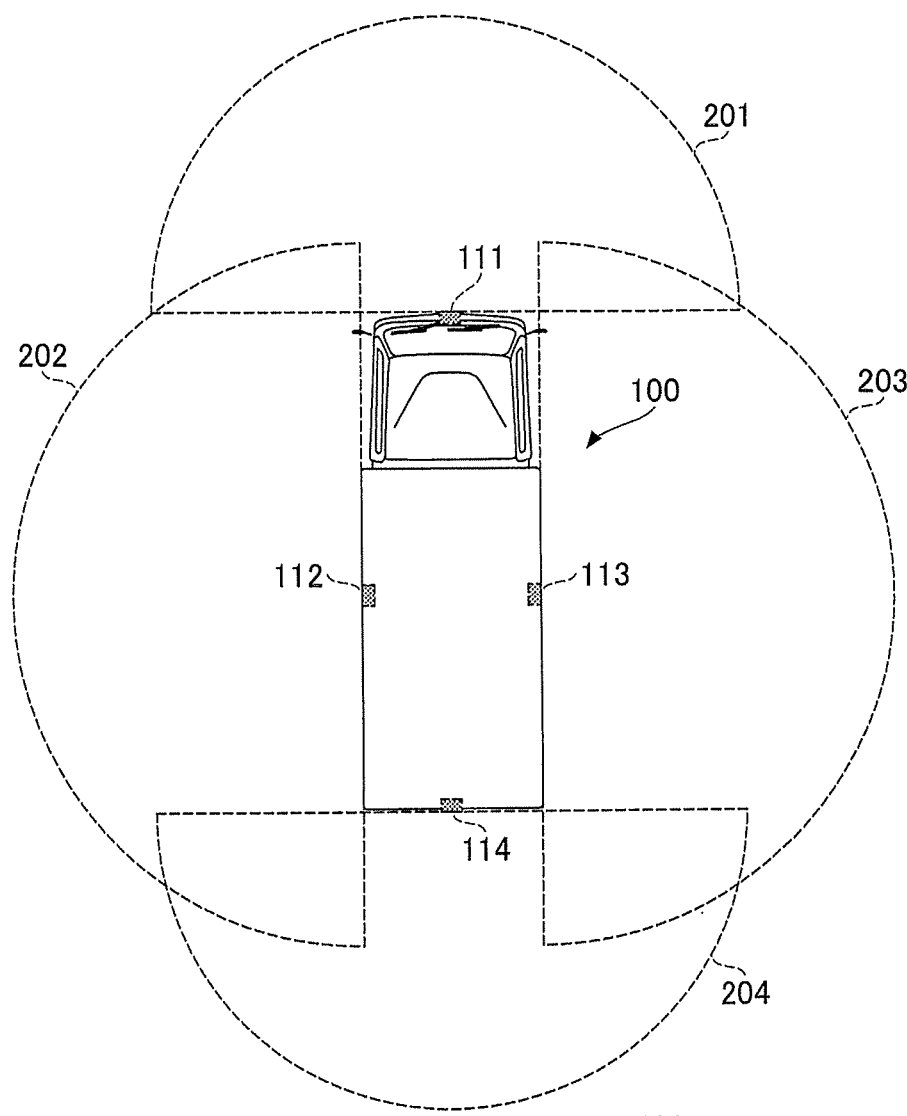
FIG. 2A and FIG. 2B are drawings illustrating an example of disposing devices included in a three-dimensional overhead image generation system.
Figure 2B:
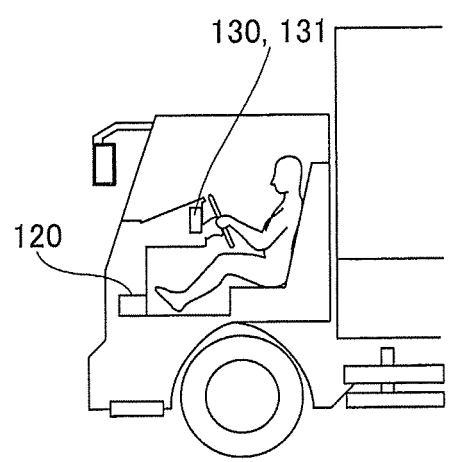

FIG. 2A and FIG. 2B are drawings illustrating an example of disposing devices included in the three-dimensional overhead image generation system. FIG. 2A is a top view illustrating an example of disposing imaging devices in the vehicle 100.

As illustrated in FIG. 2A, the imaging device 111 is disposed on a center position of the front of the vehicle 100, and images a front area from the vehicle 100 (which is an area illustrated by a dotted line 201). The imaging device 112 is disposed on a center position of the left side of the vehicle 100, and images a left area from the vehicle 100 (which is an area illustrated by a dotted line 202). The imaging device 113 is disposed on a center position of the right side of the vehicle 100, and images a right area from the vehicle 100 (which is an area illustrated by a dotted line 203). The imaging device 114 is disposed on a center position of the rear of the vehicle 100, and images a rear area from the vehicle 100 (which is an area illustrated by a dotted line 204).

FIG. 2B is a side view of an example of disposing the image processing device 120, the operation device 130, and the display device 131 in the vehicle 100. As illustrated in FIG. 2B, the image processing device 120 is disposed in the back of a center console of the vehicle 100. The operation device 130 and the display device 131 are disposed on the center console of the vehicle 100.

(2) An Appearance Configuration of the Operation Device and the Display Device

Figure 3:
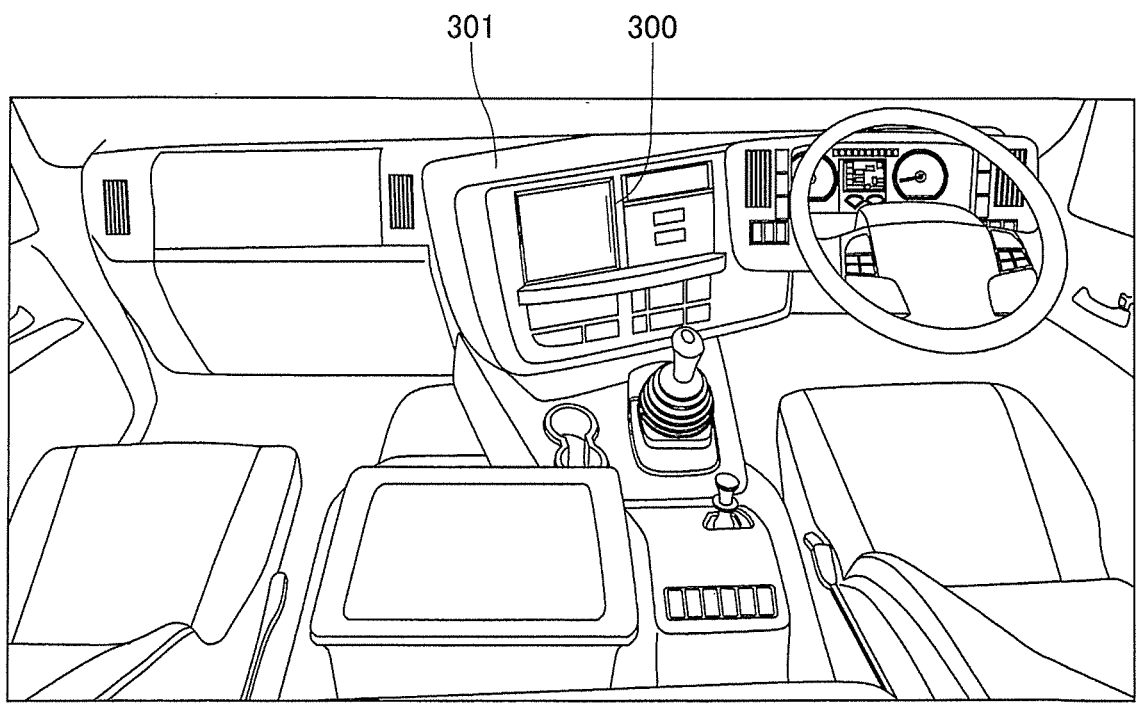
FIG. 3 is a drawing illustrating an appearance configuration of an operation device and a display device.

Next, an appearance configuration of the operation device 130 and the display device 131 disposed on the center console in the vehicle 100 will be described. FIG. 3 is a drawing illustrating an appearance configuration of the operation device and the display device. In the present embodiment, the operation device 130 and the display device 131 are integrated, and configured as what is called a touch panel 300. As illustrated in FIG. 3, the touch panel 300 is attached by being built in a position near the center of the center console 301.

(3) Details of the Projection Information

Next, details of the projection information stored in the projection information storage unit 125 will be described. FIG. 4A and FIG. 4B are drawings illustrating an example of the projection information. As illustrated in FIG. 4A, the projection information 400 includes "imaging device" and "three-dimensional projection surface coordinates" as information items.

The item "imaging device" further includes "section" and "image pixel coordinates". In the item "section", information for distinguishing between the imaging devices from 111 to 114 is stored. In the projection information 400, "1" in the item "section" indicates the imaging device 111, "2" in the item "section" indicates the imaging device 112, "3" in the item "section" indicates the imaging device 113, and "4" in the item "section" indicates the imaging device 114.

In the item "image pixel coordinates", a set of coordinates of each pixel in each image data imaged by the imaging devices from 111 to 114 is stored. In the present embodiment, image data from 411 to 414 imaged by the imaging devices from 111 to 114 each have pixel counts of n×m pixels.

Thus, in the projection information 400, for example, n×m sets of coordinates from (s11, t11) to (s1n, t1m) of the image data 411 are stored in the item "image pixel coordinates" of the imaging device 111 (which is "1" in the item "section"). Similarly, n×m sets of coordinates from (s21, t21) to (s2n, t2m) of the image data 412 are stored in the item "image pixel coordinates" of the imaging device 112 (which is "2" in the item "section"). Additionally, n×m sets of coordinates from (s31, t31) to (s3n, t3m) of the image data 413 are stored in the item "image pixel coordinates" of the imaging device 113 (which is "3" in the item "section").

Furthermore, n×m sets of coordinates from (s41, t41) to (s4n, t4m) of the image data 414 are stored in the item "image pixel coordinates" of the imaging device 114 (which is "4" in the item "section"). In the item "three-dimensional projection surface coordinates", coordinates on the three-dimensional projection surface 420 to which the image pixel coordinates of the image data from 411 to 414 point, are stored. Thus, each set of coordinates stored in the item "three-dimensional projection surface coordinates" corresponds to a set of coordinates in the item "image pixel coordinates".

For example, in the projection information 400, image pixel coordinates (s11, t11) of the image data 411 correspond to three-dimensional projection surface coordinates (x11, y11, z11). Similarly, image pixel coordinates (s21, t21) of the image data 412 correspond to three-dimensional projection surface coordinates (x21, y21, z21). Similarly, image pixel coordinates (s31, t31) of the image data 413 correspond to three-dimensional projection surface coordinates (x31, y31, z31). Similarly, image pixel coordinates (s41, t41) of the image data 414 correspond to three-dimensional projection surface coordinates (x41, y41, z41).

The image data from 411 to 414 imaged by the imaging devices from 111 to 114 is obtained by the image data obtaining unit 121 of the image processing device 120, and is projected to the three-dimensional projection surface 420 by the projection unit 122 based on the projection information 400.

The image data from 411 to 414 projected to the three-dimensional projection surface 420 is combined by the composition unit 123, and the three-dimensional overhead image is generated by inserting a vehicle image. In FIG. 4B, a vehicle image 430 placed in the three-dimensional projection surface 420 indicates a vehicle image of the reference vehicle.

(4) A Specific Example of the Display Image Data

Next, a specific example of the display image data generated by the output unit 124 in order to display the three-dimensional overhead image generated by the composition unit 123 as an image viewed from a predetermined viewpoint position, will be described. Here, the display image data generated when the three-dimensional overhead image generation system 140 is installed in the reference vehicle will be described.

Figure 5A:
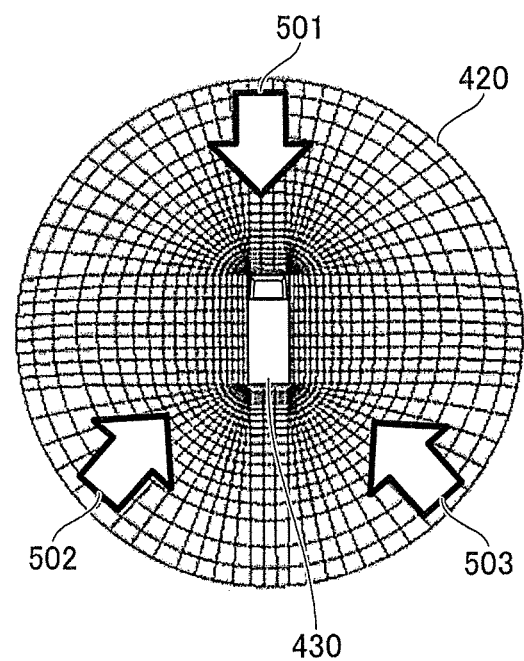
FIG. 5A and FIG. 5B are drawings illustrating an example of display image data.
Figure 5B:
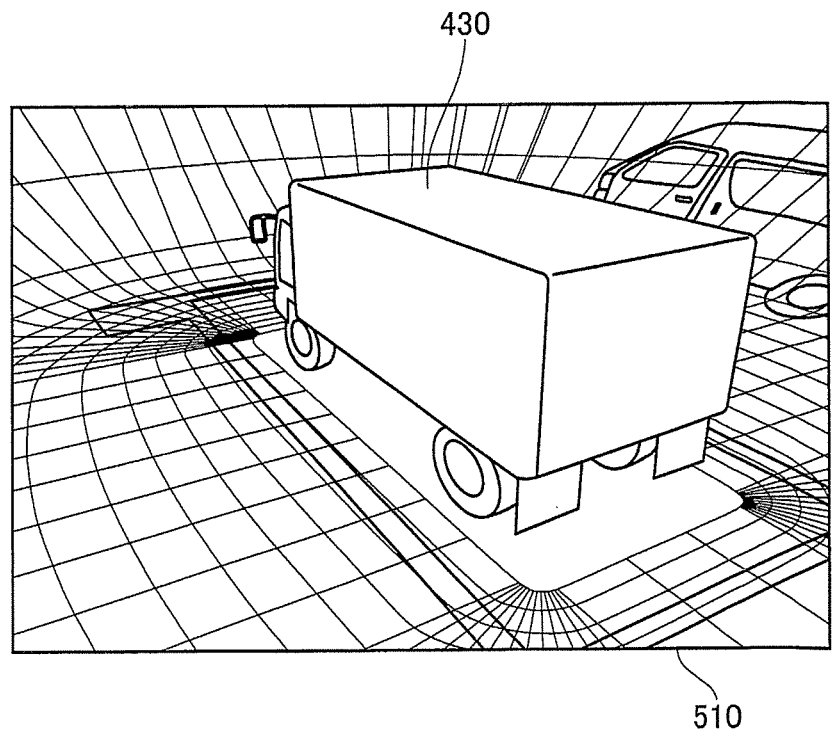

FIG. 5A and FIG. 5B are drawings illustrating an example of the display image data. FIG. 5A is a top view of the three-dimensional projection surface 420, and indicates viewpoint positions in the three-dimensional projection surface 420. A viewpoint position 501 indicates a viewpoint position used for creating the display image data when the three-dimensional overhead image is viewed in a front position from the reference vehicle. A viewpoint position 502 indicates a viewpoint position used for creating the display image data when the three-dimensional overhead image is viewed in a left rear position from the reference vehicle. A viewpoint position 503 indicates a viewpoint position used for creating the display image data when the three-dimensional overhead image is viewed in a right rear position from the reference vehicle.

FIG. 5B illustrates an example of the display image data generated by the output unit 124 based on the viewpoint position 502. As illustrated in FIG. 5B, for the reference vehicle, an area from a left side to a rear surface of the vehicle image 430 is included in the display image data 510 generated by the output unit 124.

<A Description of a Method of a Calibration Process when the Three Dimensional Overhead Image Generation System is Installed in the Vehicle 100>

Next, a method of a calibration process to be performed when the three-dimensional overhead image generation system 140 is installed in the vehicle 100 will be described. As described above, the vehicle 100 is of different vehicle type from the reference vehicle, and the size of the vehicle is different. Thus, when the three-dimensional overhead image generation system 140 is installed in the vehicle 100, as installation positions of the imaging devices from 111 to 114 are different, for example, it is necessary to calibrate the three-dimensional overhead image generation system 140 with respect to the vehicle 100.

Figure 6:
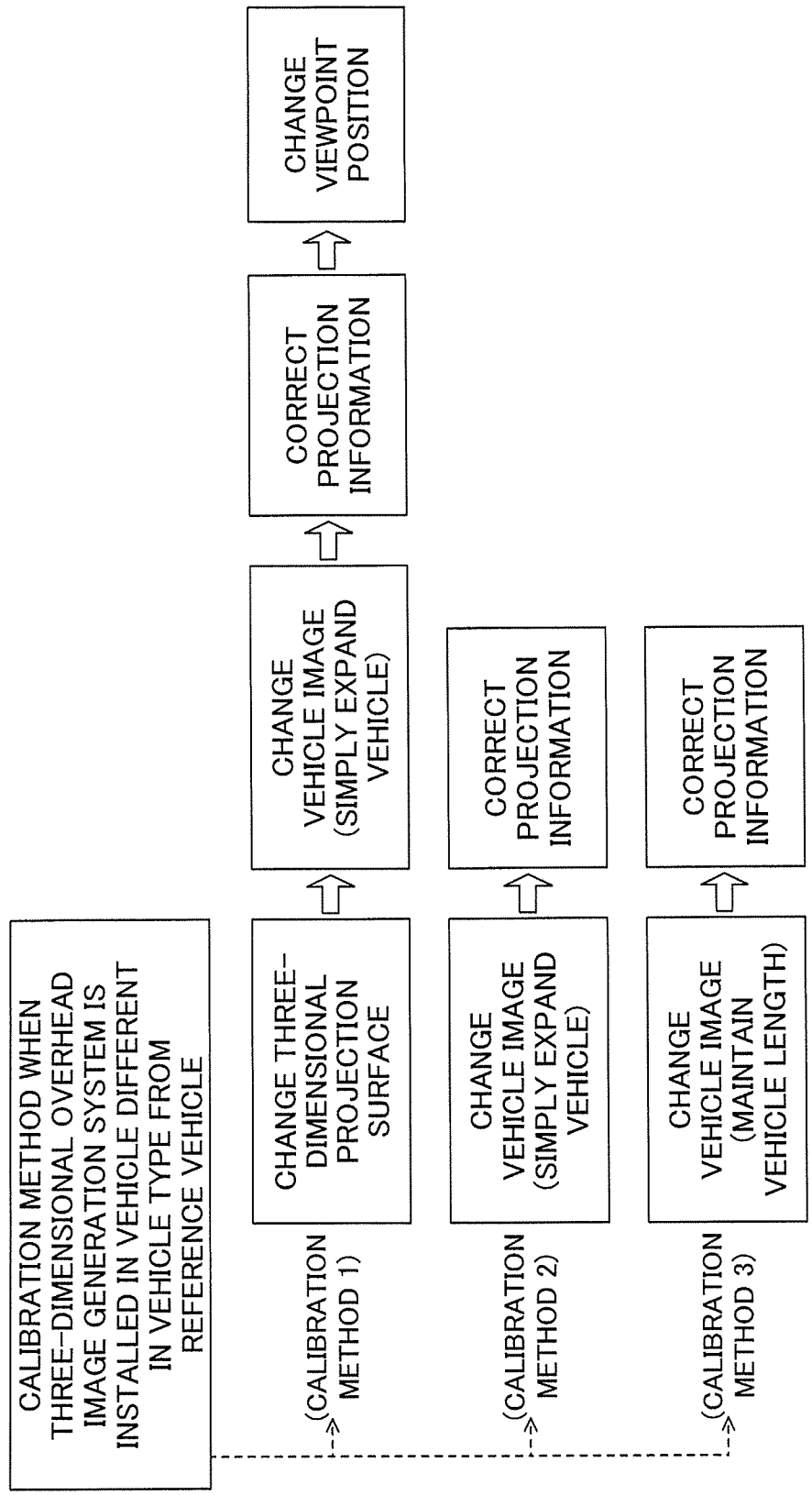
FIG. 6 is a drawing illustrating a comparison between multiple methods of a calibration process.

FIG. 6 is a drawing illustrating a comparison between multiple methods of a calibration process. A calibration method 1 is a method of a calibration process that changes the three-dimensional projection surface 420 and the vehicle image 430 when the vehicle size is changed, and that further corrects the projection information 400 and changes the viewpoint positions from 501 to 503 in accordance with a change of the three-dimensional projection surface 420.

As the calibration method 1 is a calibration process including contents that are nearly equal to contents of a calibration process performed by a vehicle manufacturer in vehicle manufacturing, an appropriate three-dimensional overhead image can be generated, and display image data similar to the display image data of the reference vehicle can be displayed. However, the calibration method 1 requires a high workload of a calibration operation performed by a calibrating technician.

The calibration method 2 is a method of a calibration process that does not change the viewpoint positions from 501 to 503 when the vehicle size is changed, and changes the vehicle image 430 and corrects the projection information 400. The calibration method 2 can decrease a workload of a calibration operation performed by a calibrating technician. However, the calibration method 2 causes a problem that a rear surface of the vehicle image of the vehicle 100 cannot be displayed when the vehicle 100 is larger than the reference vehicle, for example.

Figure 7A:
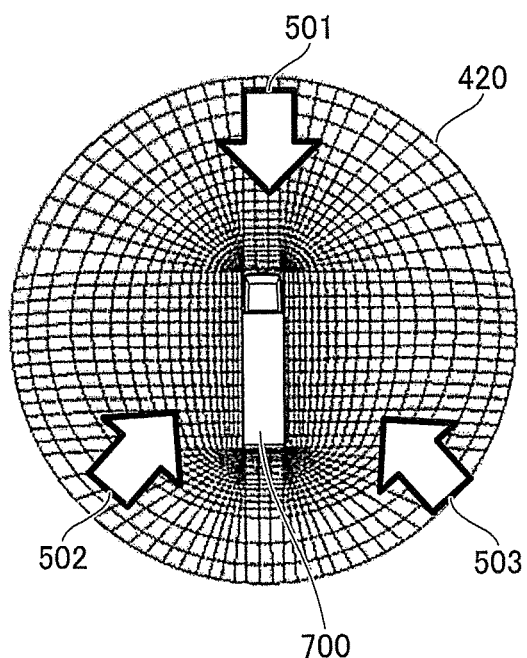
FIGS. 7A and 7B are drawings illustrating an example of display image data when a calibration process of a calibration method 2 is performed.
Figure 7B:
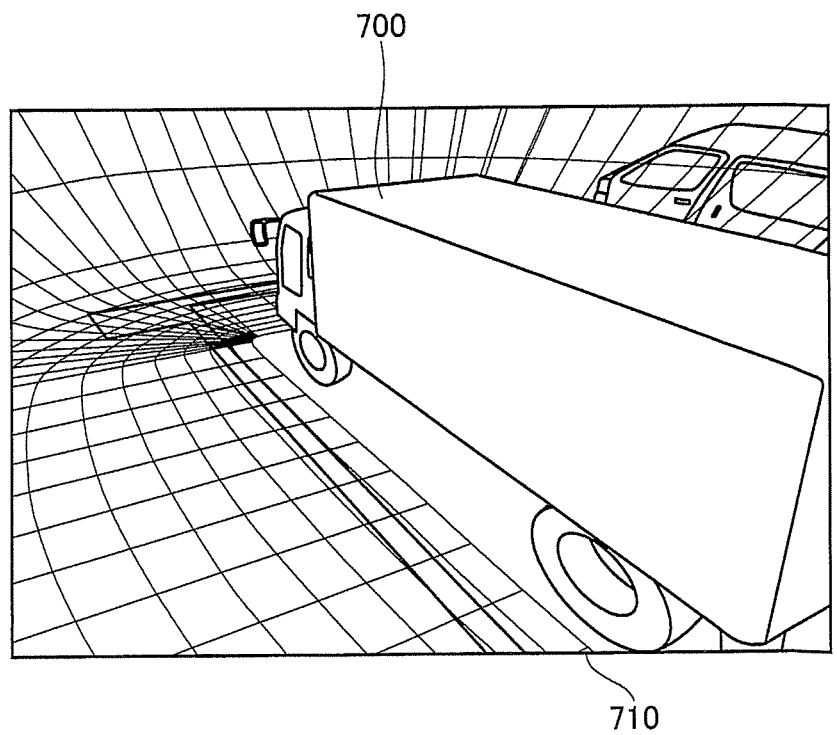

Description will specifically be made by using FIG. 7A and FIG. 7B. FIGS. 7A and 7B are drawings illustrating an example of the display image data when a calibration process of the calibration method 2 is performed. As illustrated in FIG. 7A, the calibration method 2 does not change the three-dimensional projection surface 420 and the viewpoint positions from 501 to 503. The calibration method 2 changes the vehicle image 430 of the reference vehicle to the vehicle image 700 of the vehicle 100, and corrects the projection information 400 based on a relation between each of imaging device positions of the vehicle 100 and a three-dimensional projection surface position.

Thus, as illustrated in FIG. 7B, the calibration method 2 causes a problem that a rear surface of the vehicle image 700 of the vehicle 100 cannot be displayed in the display image data 710 generated based on the viewpoint position 502.

Returning to a description of FIG. 6, with respect to the above, the calibration method 3 is a method of a calibration process that does not change the three-dimensional projection surface 420 and the viewpoint positions from 501 to 503, and corrects the vehicle image of the vehicle 100 in accordance with a front-rear length ratio between the vehicle 100 and the reference vehicle, and corrects the projection information 400 in accordance with the front-rear length ratio. The calibration method 3 can decrease a workload of a calibration operation performed by a calibrating technician.

In addition, the vehicle image of the vehicle 100 corrected by the calibration method 3 and the vehicle image 430 of the reference vehicle are equal in length. Furthermore, the calibration method 3 corrects the projection information 400 based on a relation between each of imaging device positions corrected in accordance with the front-rear length ratio and a three-dimensional projection surface position. Thus, the calibration method 3 can display a rear surface of the vehicle image of the vehicle 100 in the display image data even when the vehicle 100 is larger than the reference vehicle.

Therefore, the correction unit 160 of the information processing apparatus 150 in the present embodiment performs a calibration process of the calibration method 3 on the three-dimensional overhead image generation system 140 installed in the vehicle 100. In the following, details of the information processing apparatus 150 that performs a calibration process of the calibration method 3 will be described.

<Details of the Information Processing Apparatus>

(1) A Hardware Configuration

Figure 8:
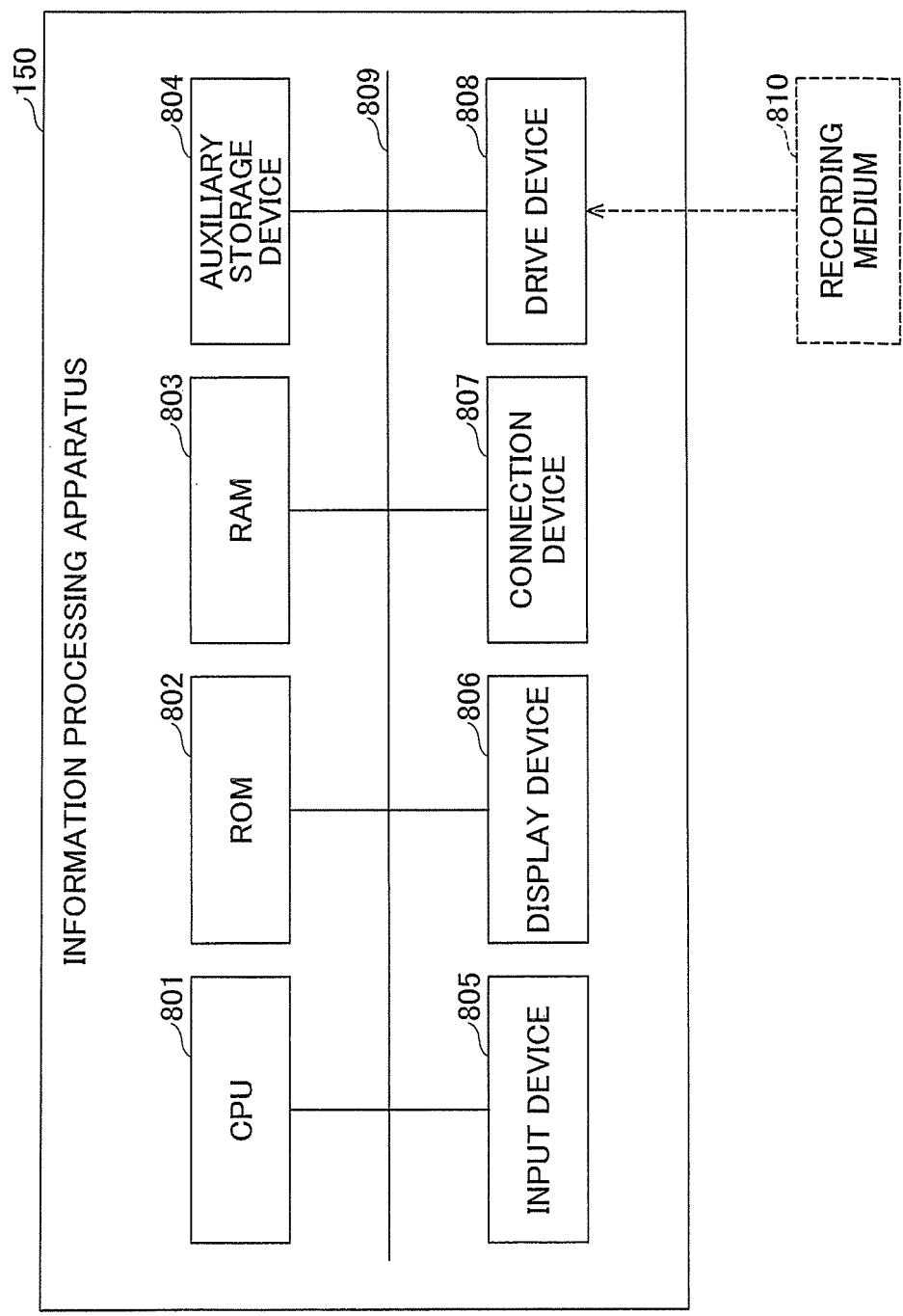
FIG. 8 is a drawing illustrating an example of a hardware configuration of an information processing apparatus.

First, a hardware configuration of the information processing apparatus 150 will be described. FIG. 8 is a drawing illustrating an example of a hardware configuration of the information processing apparatus.

As illustrated in FIG. 8, the information processing apparatus 150 includes, a CPU (Central Processing Unit) 801, a ROM (Read Only Memory) 802, and a RAM (Random Access Memory) 803. The CPU 801, the ROM 802, and the RAM 803 form what is called a computer. The information processing apparatus 150 includes an auxiliary storage device 804, an input device 805, a display device 806, a connection device 807, and a drive device 808. The respective hardware devices of the information processing apparatus 150 are mutually connected through a bus 809.

The CPU 801 executes various programs (e.g., a correction program) installed in the auxiliary storage device 804.

The ROM 802 is a non-volatile memory. The ROM 802 functions as a main storage device that stores various programs and data that are necessary for the CPU 801 to execute various programs installed in the auxiliary storage device 804, for example. Specifically, the ROM 802 stores a boot program such as a BIOS (Basic Input/Output System) and an EFI (Extensible Firmware Interface), for example.

The RAM 803 is a volatile memory such as a DRAM (Dynamic Random Access Memory) and an SRAM (Static Random Access Memory). The RAM 803 functions as a main storage device that provides a work space in which various programs installed in the auxiliary storage device 804 are expanded when the programs are executed by the CPU 801.

The auxiliary storage device 804 is an auxiliary storage device that stores various installed programs and various information used when various programs are executed.

The input device 805 is an input device used when a calibrating technician who performs a calibration operation by using the information processing apparatus 150, for example, inputs various instructions to the information processing apparatus 150.

The display device 806 is a display device that displays internal information of the information processing apparatus 150. The connection device 807 is a communication device by which the information processing apparatus 150 connects to and communicates with the image processing device 120.

The drive device 808 is a device for setting a computer-readable recording medium 810. The recording medium 810 includes a medium that records information optically, electrically, or magnetically, such as a CD-ROM, a flexible disk, and a magnet-optical disk. Alternatively, the recording medium 810 may include a semiconductor memory that records information electrically, such as a ROM and a flash memory, for example.

Various programs installed in the auxiliary storage device 804 are, for example, installed by the distributed recording medium 810 being set in the drive device 808 and by the drive device 808 reading various programs recorded in the recording medium 810. Alternatively, various programs installed in the auxiliary storage device 804 may be installed by downloading from a network through the connection device 807.

(2) Details of a Functional Configuration

Figure 9:
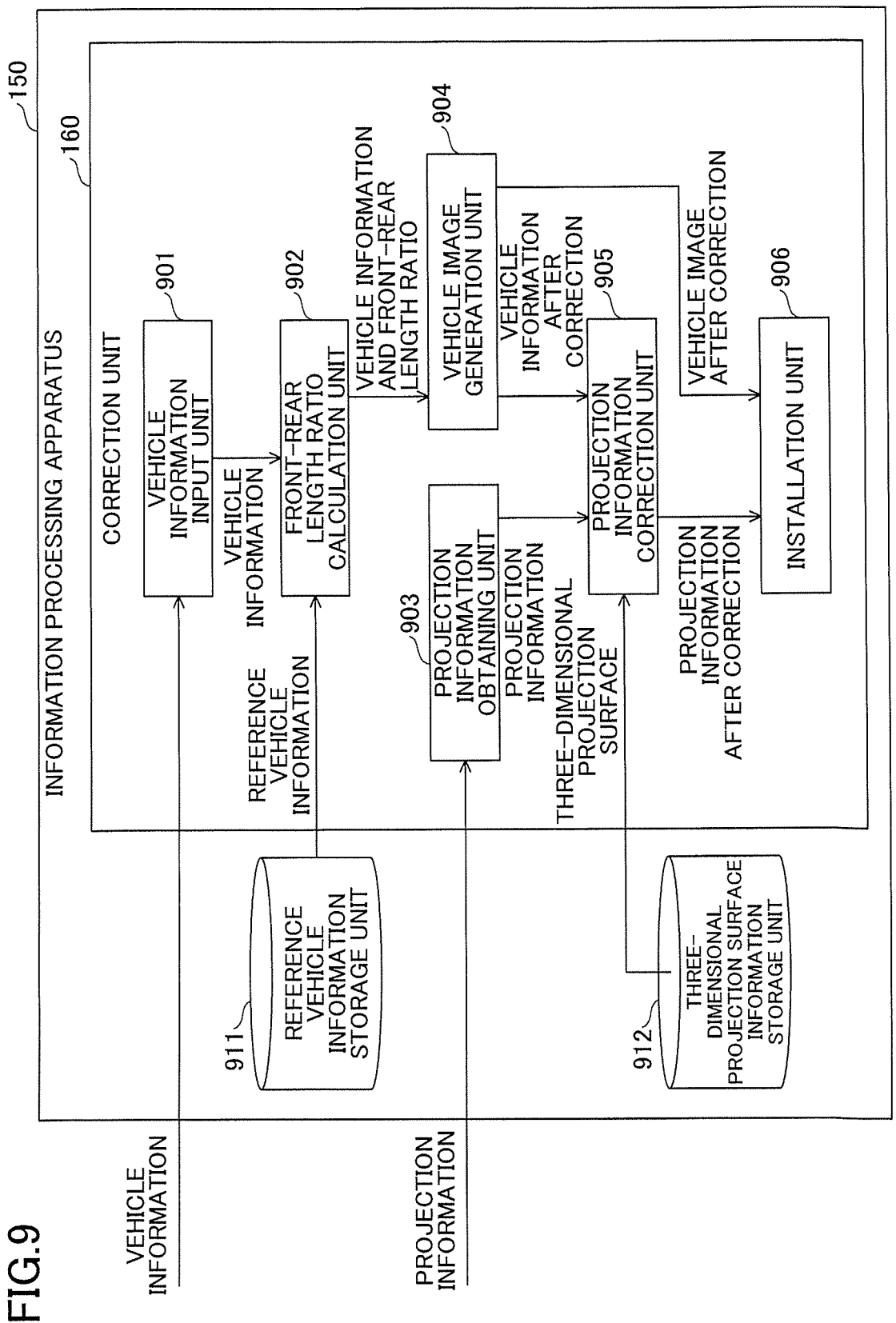
FIG. 9 is a first drawing illustrating details of a functional configuration of a correction unit in an information processing apparatus.

Next, details of a functional configuration of the correction unit 160 in the information processing apparatus 150 will be described. FIG. 9 is a first drawing illustrating details of a functional configuration of the correction unit in the information processing apparatus. As illustrated in FIG. 9, the correction unit 160 includes a vehicle information input unit 901, a front-rear length ratio calculation unit 902, a projection information obtaining unit 903, a vehicle image generation unit 904, a projection information correction unit 905, and an installation unit 906.

The vehicle information input unit 901 is an example of an input unit, and accepts inputs of vehicle information including size information (i.e., vehicle width and vehicle length) and imaging device information (i.e., a position and direction) of the vehicle 100 in which the three-dimensional overhead image generation system 140 is installed. The vehicle information input unit 901 accepts an input of the vehicle information from a calibrating technician by displaying a predetermined operation screen on the display device 806. The vehicle information input unit 901 sends the vehicle information, which is accepted, to the front-rear length ratio calculation unit 902.

In response to receiving the vehicle information from the vehicle information input unit 901, the front-rear length ratio calculation unit 902 reads reference vehicle information stored in a reference vehicle information storage unit 911, and calculates a front-rear length ratio (i.e., a size ratio) between the vehicle 100 and the reference vehicle by comparing the reference vehicle information with the vehicle information that is received. The front-rear length ratio calculation unit 902 sends a calculated front-rear length ratio and the vehicle information to the vehicle image generation unit 904.

The projection information obtaining unit 903 is an example of an obtaining unit, and obtains the projection information 400 from the projection information storage unit 125 of the image processing device 120, and sends the projection information 400 to the projection information correction unit 905.

The vehicle image generation unit 904 is an example of a generation unit, and in response to receiving the vehicle information from the front-rear length ratio calculation unit 902, the vehicle image generation unit 904 generates the vehicle image 700 of the vehicle 100 based on the size information (i.e., vehicle width and vehicle length) of the vehicle 100 included in the vehicle information. The vehicle image generation unit 904 generates a vehicle image after correction (i.e., a corrected image) by correcting the vehicle image 700, which is generated, of the vehicle 100 based on the front-rear length ratio that is received (i.e., correcting the vehicle image 700 that is generated such that the vehicle image 700 is equal in length to the vehicle image 430 of the reference vehicle). The vehicle image generation unit 904 sends the vehicle image after correction that is generated to the installation unit 906.

The vehicle image generation unit 904 calculates vehicle information after correction by correcting the vehicle information based on the front-rear length ratio that is received.

Specifically, the vehicle image generation unit 904 calculates the vehicle information after correction (i.e. imaging device information corrected with corrected positions) by correcting positions in the imaging device information (a position and a direction) included in the vehicle information based on the front-rear length ratio that is received. The vehicle image generation unit 904 sends the vehicle information after correction that is calculated to the projection information correction unit 905.

The projection information correction unit 905 is an example of a correction unit. The projection information correction unit 905 receives the projection information 400 from the projection information obtaining unit 903. The projection information correction unit 905 receives the vehicle information after correction from the vehicle image generation unit 904. In addition, the projection information correction unit 905 reads three-dimensional projection surface information from a three-dimensional projection surface information storage unit 912.

The projection information correction unit 905 newly calculates a set of three-dimensional projection surface coordinates corresponding to each set of image pixel coordinates based on a relation between each of imaging device positions determined by the imaging device information after correction included in the vehicle information after correction and a position of the three-dimensional projection surface 420, which is read. The projection information correction unit 905 generates projection information after correction by correcting the three-dimensional projection surface coordinates in the projection information 400, which are received, with the three-dimensional projection surface coordinates that are newly calculated, and sends the projection information after correction to the installation unit 906.

The installation unit 906 is an example of a storage control unit, and installs the projection information after correction and the vehicle image after correction, which are sent, in the image processing device 120. The image processing device 120, which receives the projection information after correction and the vehicle information after correction, generates the three-dimensional overhead image by using the projection information after correction and the vehicle information after correction, which are calibrated with respect to the vehicle 100, and can display the display image data.

(3) A Specific Example of Information Stored in Each Storage Unit

Next, a specific example of information (i.e., the reference vehicle information and the three-dimensional projection surface information) stored in each storage unit (i.e., each of the reference vehicle information storage unit 911 and the three-dimensional projection surface information storage unit 912) of the information processing apparatus 150 will be described.

(3-1) A Specific Example of the Reference Vehicle Information

Figure 10:
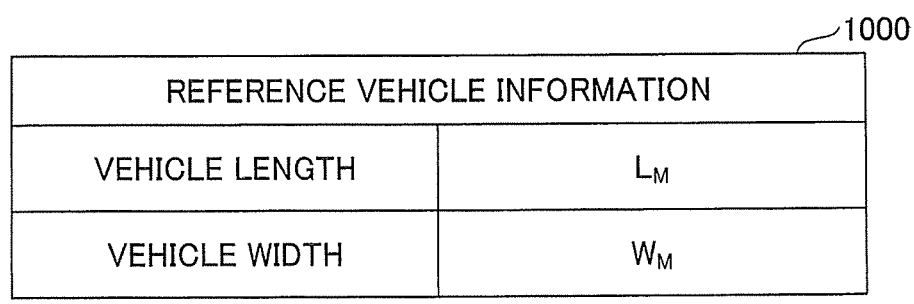
FIG. 10 is a drawing illustrating an example of reference vehicle information.

FIG. 10 is a drawing illustrating an example of the reference vehicle information. As illustrated in FIG. 10, the reference vehicle information 1000 includes "vehicle length" and "vehicle width" as information items. In the "vehicle length", reference vehicle length ($L_M$) is stored. In the "vehicle width", reference vehicle width ($W_M$) is stored.

(3-2) A Specific Example of the Three-Dimensional Projection Surface Information A specific example of the three-dimensional projection surface information is already described by using the three-dimensional projection surface 420 in FIG. 4, for example, and a calibration process of the calibration method 3 does not change the three-dimensional projection surface 420, thus a description is omitted here.

Figure 11:
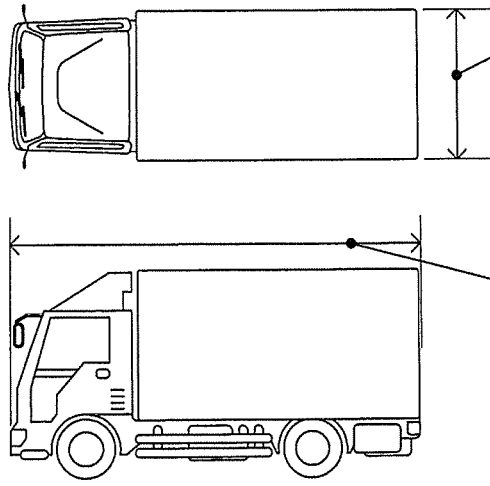
FIG. 11 is a drawing illustrating a specific example of an operation screen displayed by a vehicle information input unit.

(4) A Specific Example of an Operation Screen Displayed by the Vehicle Information Input Unit Next, a specific example of an operation screen displayed on the display device 806 by the vehicle information input unit 901 will be described. FIG. 11 is a drawing illustrating a specific example of an operation screen displayed by the vehicle information input unit.

As illustrated in FIG. 11, an operation screen 1100 includes a size information input field 1110 for an input of size information of the vehicle 100. The size information input field 1110 further includes input fields for inputs of vehicle width and vehicle length of the vehicle 100.

Additionally, the operation screen 1100 includes an imaging device information input field 1120 for an input of the imaging device information (i.e., a position and direction) of the imaging devices from 111 to 114 of the three-dimensional overhead image generation system 140 installed in the vehicle 100. The imaging device information input field 1120 includes input fields for inputs of respective positions of the imaging devices from 111 to 114 in an x direction (i.e., a width direction of the vehicle 100) from a predetermined reference position, a position in a y direction (i.e., a length direction of the vehicle 100) from the predetermined reference position, and a position in a z direction (i.e., a height direction of the vehicle 100) from the predetermined reference position. Furthermore, the imaging device information input field 1120 includes input fields for inputs of angles of a pan direction, a tilt direction, and a roll direction of the respective imaging devices from 111 to 114.

(5) A Specific Example of the Projection Information Correction Unit

Next, a specific example of the projection information correction unit 905 will be described. As described above, a set of the three-dimensional projection surface coordinates corresponding to each set of the image pixel coordinates in the projection information is calculated based on a relation between each of imaging device positions and a three-dimensional projection surface position.

In the following, first, a relation between each of imaging device positions and a three-dimensional projection surface position in the reference vehicle will be described, and a set of the three-dimensional projection surface coordinates corresponding to each set of the image pixel coordinates in the reference vehicle will be described. Next, a relation between each of imaging device positions that are corrected and a three-dimensional projection surface position that is corrected in the vehicle 100 will be described, and a set of the three-dimensional projection surface coordinates corresponding to each set of the image pixel coordinates in the vehicle 100 will be described.

Figure 12A:
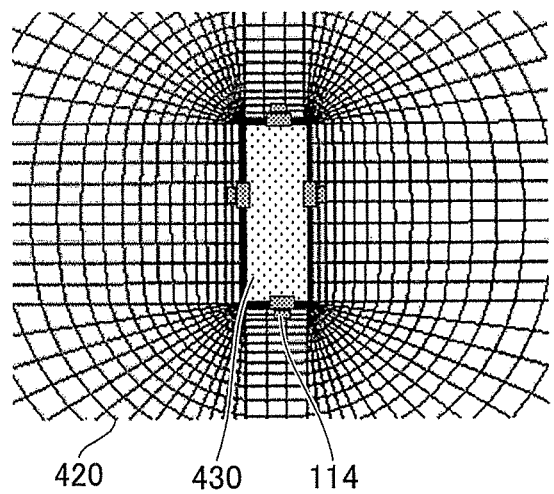
FIG. 12A and FIG. 12B are drawings illustrating a relation between each set of image pixel coordinates and three-dimensional projection surface coordinates in a reference vehicle.
Figure 12B:
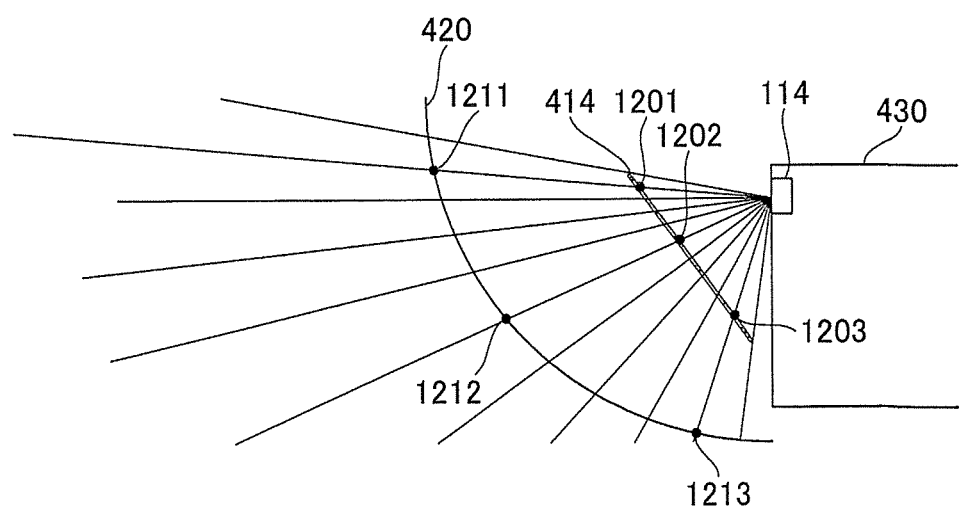

(5-1) About a Set of the Three-Dimensional Projection Surface Coordinates Corresponding to Each Set of the Image Pixel Coordinates in the Reference Vehicle FIG. 12A and FIG. 12B are drawings illustrating a relation between each set of image pixel coordinates and three-dimensional projection surface coordinates in a reference vehicle. FIG. 12A illustrates a state of the three-dimensional projection surface 420 from the above view, and FIG. 12B illustrates a state of the three-dimensional projection surface 420 from the side view. Specifically, FIG. 12B illustrates a relation between a position of the imaging device 114 and a position of the three-dimensional projection surface 420 with respect to the reference vehicle.

As illustrated in FIG. 12B, an area of a real space taken in the image data 414 imaged by the imaging device 114 is determined based on the imaging device information (i.e., a position and direction).

Under a position relation between the imaging device 114 and the three-dimensional projection surface 420, which is illustrated in FIG. 123, the projection unit 122 projects an image pixel 1201 of the image data 414 imaged by the imaging device 114 to a position 1211 on the three-dimensional projection surface 420, for example. The projection unit 122 projects an image pixel 1202 of the image data 414 imaged by the imaging device 114 to a position 1212 on the three-dimensional projection surface 420, for example. Furthermore, the projection unit 122 projects an image pixel 1203 of the image data 414 imaged by the imaging device 114 to a position 1213 on the three-dimensional projection surface 420, for example.

The set of three-dimensional projection surface coordinates corresponding to each set of image pixel coordinates in the reference vehicle is as the relation described above, and the projection information 400 stored in the projection information storage unit 125 is generated by applying the relation above with grouping for each set of image pixel coordinates and for each imaging device.

(5-2) About a Set of the Three-Dimensional Projection Surface Coordinates Corresponding to Each Set of the Image Pixel Coordinates in the Vehicle 100

Figure 13A:
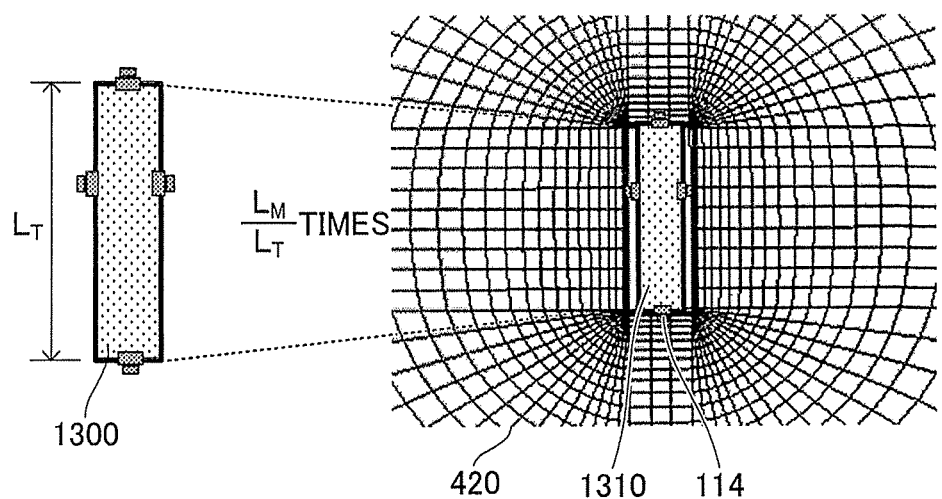
FIG. 13A and FIG. 13B are drawings illustrating a relation between each set of image pixel coordinates and three-dimensional projection surface coordinates in a vehicle of different vehicle type from a reference vehicle.
Figure 13B:
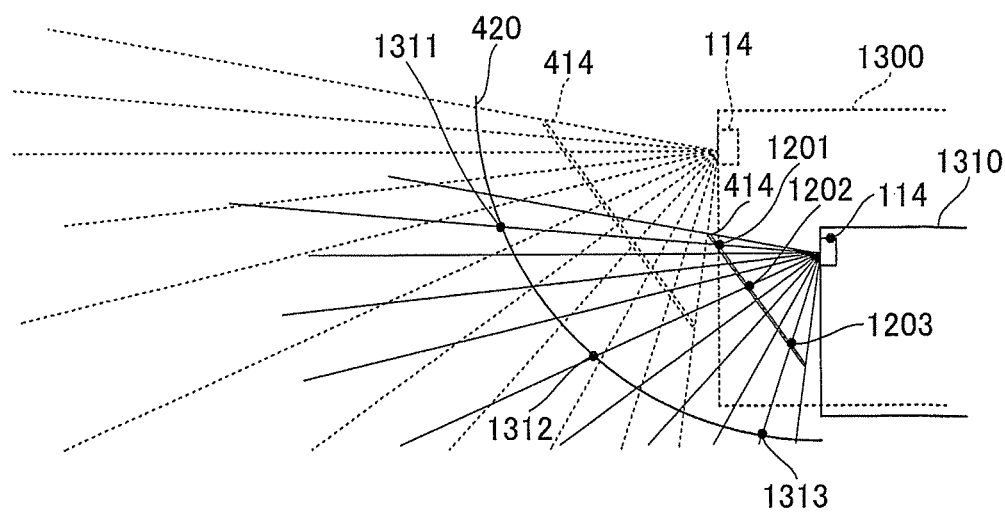

FIG. 13A and FIG. 13B are drawings illustrating a relation between each set of image pixel coordinates and three-dimensional projection surface coordinates in a vehicle of different vehicle type from the reference vehicle. FIG. 13A illustrates a state of the three-dimensional projection surface 420 from the above view. As illustrated in FIG. 13A, a vehicle image after correction 1310 is generated by correcting a vehicle image 1300, which is generated based on the size information of the vehicle 100, based on the front-rear length ratio calculated in accordance with the vehicle length of the vehicle 100 and the vehicle length of the reference vehicle.

Specifically, when the vehicle length of the vehicle 100 is $L_T$ and the vehicle length of the reference vehicle is $L_M$, a front-rear length ratio is equal to $L_M/L_T$. Thus, the vehicle image generation unit 904 generates a vehicle image after correction 1310 by scaling the vehicle image 1300, which is generated based on the size information of the vehicle 100, $L_M/L_T$ times in a length direction, $L_M/L_T$ times in a width direction, and $L_M/L_T$ times in a height direction. For example, when $L_T=8$ [m] and $L_M=5$ [m], a vehicle image after correction 1310 is generated by scaling the vehicle image 1300, which is generated based on the size information of the vehicle 100, ⅝ times in a length direction, ⅝ times in a width direction, and ⅝ times in a height direction.

FIG. 13B illustrates a state of the three-dimensional projection surface 420 from the side view, and a relation between a position of the imaging device 114 and a position of the three-dimensional projection surface 420 with respect to the vehicle 100. In FIG. 13B, a dotted line indicates a position relation between the vehicle image 1300 of the vehicle 100 and the three-dimensional projection surface 420. A solid line indicates a position relation between the vehicle image after correction 1310 of the vehicle 100 and the three-dimensional projection surface 420. As illustrated by a solid line, under a position relation between the vehicle image after correction 1310 of the vehicle 100 and the three-dimensional projection surface 420, the projection unit 122 projects the image pixel 1201 of the image data 414 to a position 1311 on the three-dimensional projection surface 420, for example. The projection unit 122 projects the image pixel 1202 of the image data 414 to a position 1312 on the three-dimensional projection surface 420, for example. Furthermore, the projection unit 122 projects the image pixel 1203 of the image data 414 to a position 1313 on the three-dimensional projection surface 420, for example.

Thus, the projection information correction unit 905 corrects a set of three-dimensional projection surface coordinates to which the image pixel 1201 is projected, from a set of coordinates of the position 1211 (in FIG. 12B) to a set of coordinates of the position 1311 (in FIG. 13B) in the projection information 400, for example. Similarly, the projection information correction unit 905 corrects a set of three-dimensional projection surface coordinates to which the image pixel 1202 is projected, from a set of coordinates of the position 1212 (in FIG. 12B) to a set of coordinates of the position 1312 (in FIG. 13B) in the projection information 400, for example. Similarly, the projection information correction unit 905 corrects a set of three-dimensional projection surface coordinates to which the image pixel 1203 is projected, from a set of coordinates of the position 1213 (in FIG. 12B) to a set of coordinates of the position 1313 (in FIG. 13B) in the projection information 400, for example.

FIG. 14 is a drawing illustrating a specific example of the projection information after correction. As illustrated in FIG. 14, the projection information after correction 1400 is generated by the projection information correction unit 905 correcting "three-dimensional projection surface coordinates" corresponding to "image pixel coordinates" in the projection information 400 as described above.

(6) A Calibration Process Flow by the Correction Unit

Figure 15:
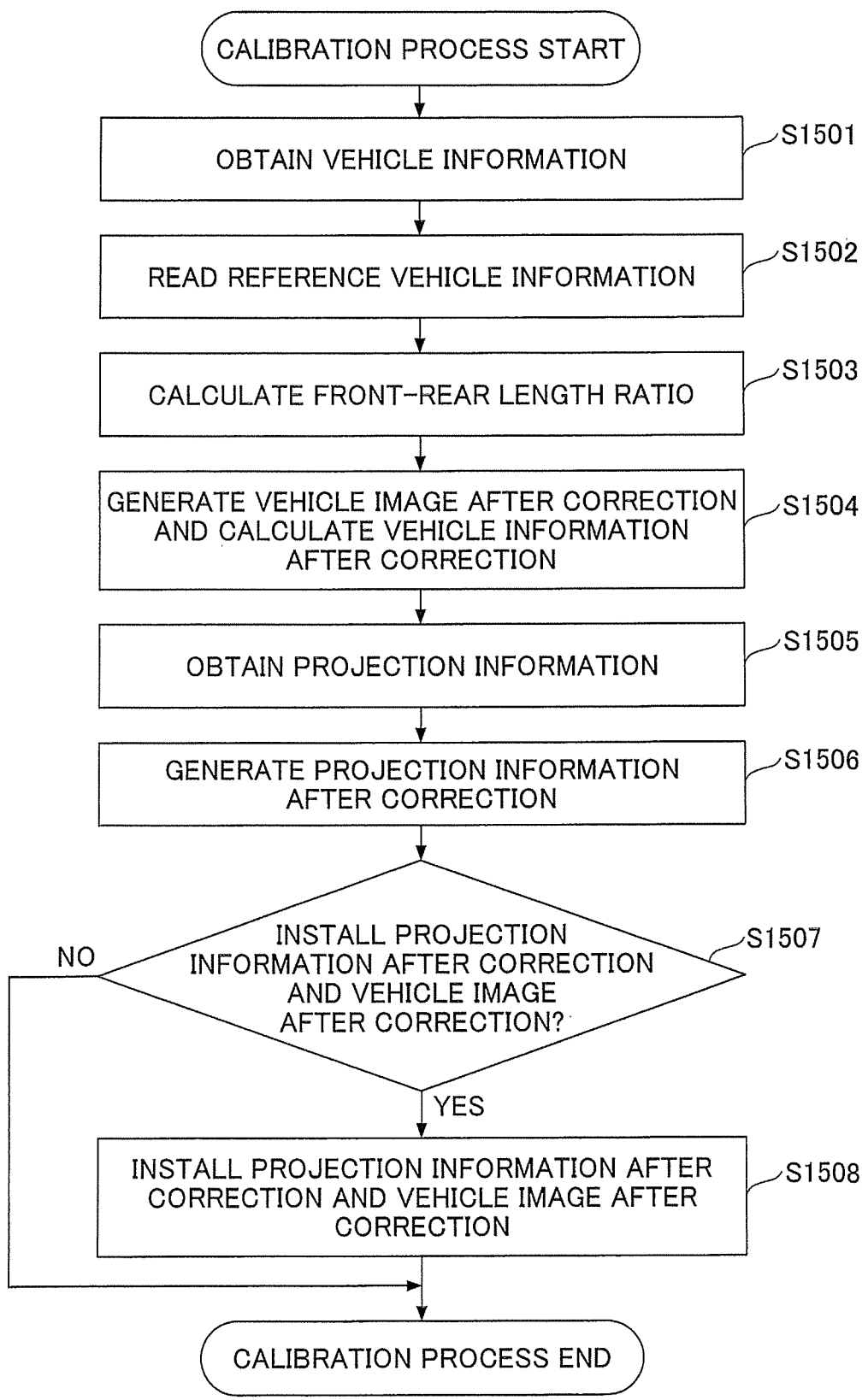
FIG. 15 is a flowchart illustrating a flow of a calibration process performed by a correction unit.

Next, a calibration process (i.e., a calibration process of the calibration method 3) flow by the correction unit 160 of the information processing apparatus 150 will be described. FIG. 15 is a flowchart illustrating a flow of a calibration process performed by the correction unit. A calibration process illustrated in FIG. 15 is started when the information processing apparatus 150 is connected to the image processing device 120, and the correction unit 160 is launched.

In step S1501, the vehicle information input unit 901 displays the operation screen 1100 on the display device 806, and accepts the vehicle information of the vehicle 100 that is input by a calibrating technician who performs a calibration operation or the like by using the information processing apparatus 150.

In step S1502, the front-rear length ratio calculation unit 902 reads the reference vehicle information 1000 stored in the reference vehicle information storage unit 911.

In step S1503, the front-rear length ratio calculation unit 902 calculates the front-rear length ratio based on the size information of the vehicle 100 (i.e., the vehicle length $L_T$) included in the vehicle information, and the reference vehicle information 1000 (i.e., the vehicle length $L_M$).

In step S1504, the vehicle image generation unit 904 generates the vehicle image after correction 1310 by correcting the vehicle image 1300 generated based on the size information of the vehicle 100, based on the front-rear length ratio. The vehicle image generation unit 904 calculates vehicle information after correction by correcting the imaging device information included in the vehicle information based on the front-rear length ratio.

In step S1505, the projection information obtaining unit 903 obtains the projection information 400 from the image processing device 120.

In step S1506, the projection information correction unit 905 corrects the three-dimensional projection surface coordinates in the projection information 400 based on a relation between a corrected position of the imaging device determined by the imaging device information included in the vehicle information after correction and a position of the three-dimensional projection surface 420. Thus, the projection information correction unit 905 generates the projection information after correction 1400.

In step S1507, the installation unit 906 determines whether the installation unit 906 installs the projection information after correction 1400 generated by the projection information correction unit 905 and the vehicle image after correction 1310 generated by the vehicle image generation unit 904.

In step S1507, when the installation unit 906 determines not to install (i.e., when "No" is selected in step S1507), the calibration process ends. In step S1507, when the installation unit 906 determines to install (i.e., when "Yes" is selected in step S1507), the calibration process moves to step S1508.

In step S1508, the installation unit 906 installs the projection information after correction 1400 and the vehicle image after correction 1310 by sending both said information and image to the image processing device 120.

<A Specific Example of the Display Image Data after the Calibration Process is Performed>

Next, the display image data after the calibration process of the calibration method 3 (illustrated in FIG. 15) is performed on the three-dimensional overhead image generation system 140 installed in the vehicle 100 (i.e., after the projection information after correction 1400 and the vehicle image after correction 1310 are installed) will be described.

Figure 16:
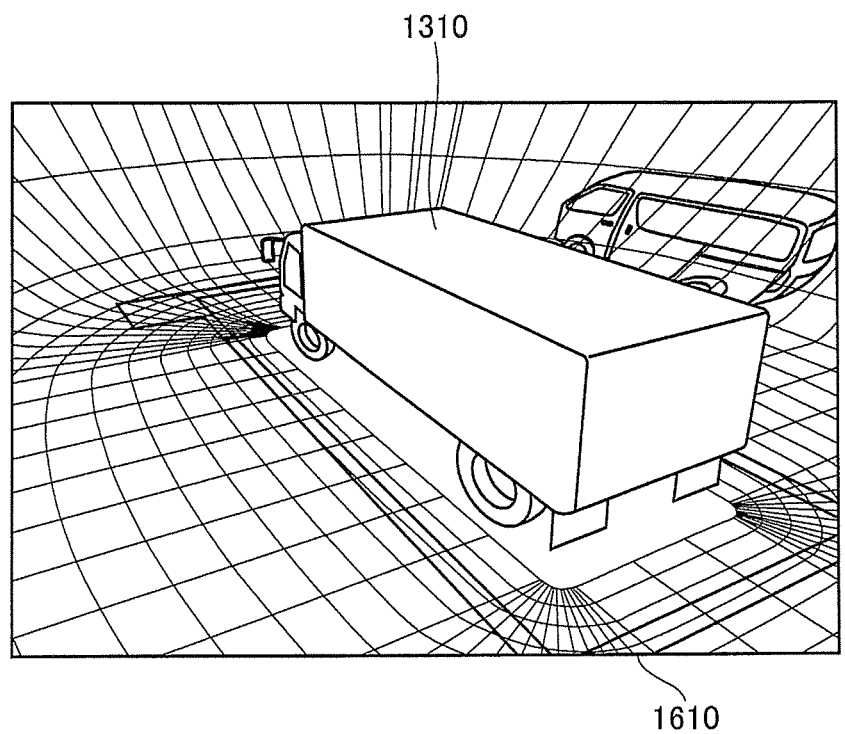
FIG. 16 is a drawing illustrating an example of display image data after a calibration process of a calibration method 3 is performed.

FIG. 16 is a drawing illustrating an example of the display image data after a calibration process of the calibration method 3 is performed. As illustrated in FIG. 7B, while the calibration method 2 cannot display the rear surface of the vehicle image 700, the calibration method 3 can display the rear surface of the vehicle image after correction 1310 as illustrated by the display image data 1610.

CONCLUSION

As is clear from the description above, the information processing apparatus 150 according to the first embodiment:

Obtains the projection information 400 used when multiple image data, which is imaged by multiple imaging devices from 111 to 114 installed in the reference vehicle, is projected to the three-dimensional projection surface and the three-dimensional overhead image is generated, from the three-dimensional overhead image generation system 140

Accepts an input of the vehicle information including the size information of the vehicle 100, in which the three-dimensional overhead image generation system 140 is installed, different from the reference vehicle Generates the projection information after correction 1400 by correcting the three-dimensional projection surface coordinates in the projection information 400 based on the front-rear length ratio between the reference vehicle and the vehicle 100 generated in accordance with the reference vehicle information and the size information of the vehicle 100

Installs the projection information after correction 1400 in the image processing device 120 of the three-dimensional overhead image generation system 140 installed in the vehicle 100

As described, according to the information processing apparatus 150, even when the three-dimensional overhead image generation system 140 for the reference vehicle is installed in the vehicle 100, an appropriate three dimensional overhead image is generated and the display image data equivalent to the display image data of the reference vehicle can be displayed only by inputting the vehicle information of the vehicle 100.

Thus, the information processing apparatus 150 of the first embodiment can decrease an operation load of a calibration operation when the three-dimensional overhead image generation system 140 provided for a predetermined vehicle type is installed in a vehicle of a different vehicle type.

Second Embodiment

In the first embodiment described above, a case in which the projection information after correction 1400 and the vehicle image after correction 1310 are generated by correcting the projection information 400 and the vehicle image 1300 without changing the three-dimensional projection surface 420 is described. The vehicle image after correction 1310 generated based on the front-rear length ratio has the same length as the vehicle image 430 of the reference vehicle, but has a smaller width (See FIG. 13A).

Therefore, when the three-dimensional overhead image is generated by inserting the vehicle image after correction 1310, there are no three-dimensional projection surface coordinates in areas near the left side and right side of the vehicle image after correction 1310.

With respect to the above, the second embodiment can display the three-dimensional overhead image on these areas by changing the three-dimensional projection surface 420 in a width direction. In the following, the second embodiment will be described by focusing on a difference from the first embodiment described above.

(1) Details of a Functional Configuration

Figure 17:
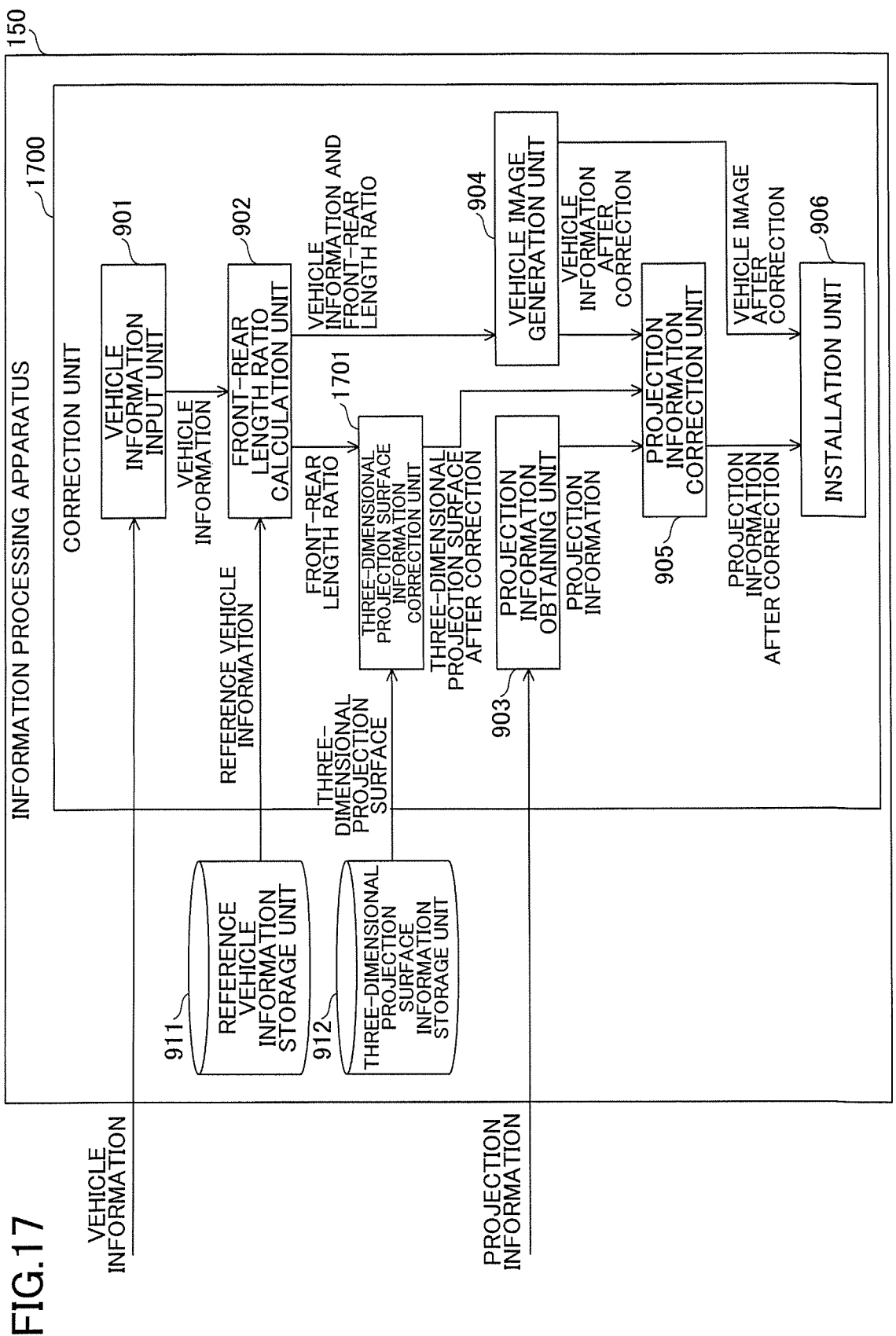
FIG. 17 is a second drawing illustrating details of a functional configuration of a correction unit in an information processing apparatus.

First, details of a functional configuration of a correction unit of the information processing apparatus 150 will be described. FIG. 17 is a second drawing illustrating details of a functional configuration of a correction unit in the information processing apparatus. A difference from FIG. 9 is that a correction unit 1700 illustrated in FIG. 17 includes a three-dimensional projection surface information correction unit 1701.

The three-dimensional projection surface information correction unit 1701 is an example of the changing unit. The three-dimensional projection surface information correction unit 1701 reads the three-dimensional projection surface 420 from the three-dimensional projection surface information storage unit 912 in response to receiving the front-rear length ratio from the front-rear length ratio calculation unit 902. The three-dimensional projection surface information correction unit 1701 changes the three-dimensional projection surface 420, which is read, in a width direction based on the front-rear length ratio, and generates a three-dimensional projection surface after correction.

The three-dimensional projection surface information correction unit 1701 sends the three-dimensional projection surface after correction that is generated to the projection information correction unit 905. The projection information correction unit 905 corrects the projection information based on the three-dimensional projection surface after correction and the vehicle information after correction, and generates the projection information after correction 1400.

Figure 18A:
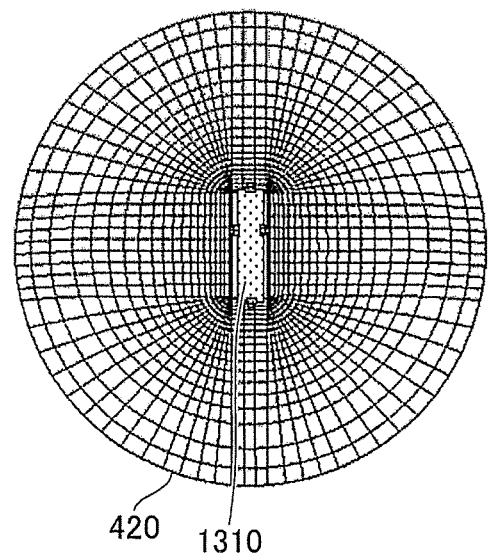
FIG. 18A and FIG. 18B are drawings illustrating a specific example of a process of a three-dimensional projection surface information correction unit.
Figure 18B:
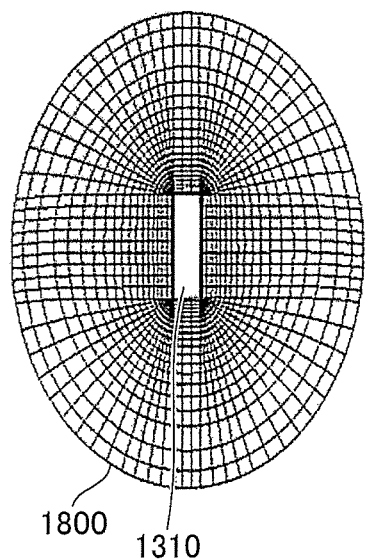

(2) A Specific Example of the Three-Dimensional Projection Surface after Correction Next a specific example of the three-dimensional projection surface after correction generated by the three-dimensional projection surface information correction unit 1701 will be described. FIG. 18A and FIG. 18B are drawings illustrating a specific example of a process of the three-dimensional projection surface information correction unit. FIG. 18A illustrates a state in which the vehicle image after correction 1310 is inserted to the three-dimensional projection surface 420 that is not changed yet by the three-dimensional projection surface information correction unit 1701. FIG. 18B illustrates a state in which the vehicle image after correction 1310 is inserted to the three-dimensional projection surface after correction 1800 that is changed by the three-dimensional projection surface information correction unit 1701.

As is clear from comparing with FIG. 18A, in FIG. 18B, there is no space between the three-dimensional projection surface after correction 1800 and the vehicle image after correction 1310 in the left side and the right side of the vehicle image after correction 1310. Thus, the three-dimensional projection surface after correction 1800 can display the three-dimensional overhead image near the left side and right side of the vehicle image after correction 1310.

As a result, the second embodiment can display the display image data that is relatively normal.

Another Embodiment

In the first and second embodiments described above, it is described that the information processing apparatus 150 functions as the correction unit 160 by installing the correction program in the information processing apparatus 150 that is separate from the three-dimensional overhead image generation system 140. However the correction program may be installed in the image processing device 120, and the image processing device 120 may be configured to function as the correction unit 160 for example.

In the first and second embodiments described above, it is described that by connecting the information processing apparatus 150 to the image processing device 120 so as to be able to communicate with each other, the projection information after correction 1400 and the vehicle image after correction 1310 are installed in the image processing device 120. However an installation method of the projection information after correction 1400 and the vehicle image after correction 1310 are not limited to this.

For example, it may be configured that the projection information after correction 1400 and the vehicle image after correction 1310, which are generated, are stored in the recording medium, and the projection information after correction 1400 and the vehicle image after correction 1310 may be installed by the image processing device 120 reading the projection information after correction 1400 and the vehicle image after correction 1310 stored in the recording medium.

Alternatively, it may be configured that the projection information after correction 1400 and the vehicle image after correction 1310 generated in the information processing apparatus 150 are sent to another communication terminal, and the projection information after correction 1400 and the vehicle image after correction 1310 are installed by another communication terminal accessing the image processing device 120.

In the first and second embodiments described above, a case in which the imaging device information is obtained by a calibrating technician inputting on the operation screen 1100 is described. However, an obtaining method of the imaging device information is not limited to this. For example, it may be configured that multiple markers are arranged around the vehicle 100 as references, and the imaging devices from 111 to 114 image the multiple markers in respective imaging areas and obtain image data, and the imaging device information is obtained by analyzing the image data that is obtained.

In the second embodiment described above, it is configured that by changing the three-dimensional projection surface 420 in a width direction based on the front-rear length ratio, the three-dimensional overhead image can be displayed near the left side and the right side of the vehicle image after correction 1310. However, a method of changing the three-dimensional projection surface 420 is not limited to this, and for example, it may be configured that only areas corresponding to the left side and the right side of the vehicle image after correction 1310 in the three-dimensional projection surface 420 is changed based on the front-rear length ratio.

The present invention is not limited to the configuration described here, such as the configurations described in the above embodiments, and a combination of other elements. According to these points, changes can be made without departing from the spirit and scope of the present invention, and can be appropriately determined in accordance with a configuration of an application.

What is claimed is:

1. An information processing apparatus, comprising:
    a memory; and
    a processor coupled to the memory
        that obtains projection information used for generating a three-dimensional overhead image by projecting a plurality of image data imaged by a plurality of imaging devices to a three-dimensional projection surface when the plurality of imaging devices are installed in a first mobile object,
        that inputs size information of a second mobile object that is different from the first mobile object,
        that corrects the projection information based on a size ratio between the first mobile object and the second mobile object, calculated based on the size information of the second mobile object, and
        that stores corrected projection information in the second mobile object.

2. The information processing apparatus as claimed in claim 1, wherein the processor corrects the projection information based on a relation between a corrected position of each of a plurality of imaging devices installed in the second mobile object and a position of the three-dimensional projection surface, the corrected position being calculated based on the size ratio.

3. The information processing apparatus as claimed in claim 2, wherein the size ratio is a ratio between front-rear length of the first mobile object and front-rear length of the second mobile object, and the processor corrects positions of the plurality of imaging devices installed in the second mobile object by correcting the front-rear length of the second mobile object based on the size ratio such that the front-rear length of the first mobile object and the front-rear length of the second mobile object are equal.

4. The information processing apparatus as claimed in claim 1, wherein the processor generates a corrected image indicating the second mobile object by correcting an image indicating the second mobile object based on the size ratio, and store the corrected image indicating the second mobile object in the second mobile object.

5. The information processing apparatus as claimed in claim 4, wherein the processor generates the corrected image indicating the second mobile object by correcting the image indicating the second mobile object in a length direction, in a width direction, and in a height direction based on the size ratio.

6. The information processing apparatus as claimed in claim 2, wherein the projection information is information that defines a correspondence between coordinates of each pixel of the plurality of image data and coordinates on the three-dimensional projection surface, the coordinates of each pixel of the plurality of image data pointing to the coordinates on the three-dimensional projection surface when the three-dimensional overhead image is generated.

7. The information processing apparatus as claimed in claim 6, wherein the processor calculates new coordinates on the three-dimensional projection surface corresponding to the coordinates of each pixel of the plurality of image data based on the relation between the corrected position of each of the plurality of imaging devices installed in the second mobile object and the position of the three-dimensional projection surface, the corrected position being calculated based on the size ratio, and correct the projection information by using the new coordinates on the three-dimensional projection surface.

8. The information processing apparatus as claimed in claim 6, the processor changes the three-dimensional projection surface in a width direction based on the size ratio.

9. The information processing apparatus as claimed in claim 6, the processor changes the three-dimensional projection surface such that only areas of the three-dimensional projection surface corresponding to side faces of the second mobile object are changed based on the size ratio.

10. The information processing apparatus as claimed in claim 1, wherein the processor inputs positions of a plurality of imaging devices installed in the second mobile object, correct the input positions of the plurality of imaging devices installed in the second mobile object based on the size ratio, and correct the projection information based on a relation between a corrected position of each of the plurality of imaging devices installed in the second mobile object and a position of the three-dimensional projection surface.

11. A non-transitory computer-readable recording medium having stored therein an information processing program for causing a computer to execute a method comprising:
    obtaining projection information used for generating a three-dimensional overhead image by projecting a plurality of image data imaged by a plurality of imaging devices to a three-dimensional projection surface when the plurality of imaging devices are installed in a first mobile object;
    inputting size information of a second mobile object that is different from the first mobile object;
    correcting the projection information based on a size ratio between the first mobile object and the second mobile object, calculated based on the size information of the second mobile object; and
    storing corrected projection information in the second mobile object.

* * * * *